United States Patent
Zibuschka et al.

(10) Patent No.: US 10,701,088 B2
(45) Date of Patent: Jun. 30, 2020

(54) METHOD FOR TRANSMITTING DATA

(71) Applicant: Robert Bosch GmbH, Stuttgart (DE)

(72) Inventors: Jan Zibuschka, Magstadt (DE); Ralph Retter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 15/796,936

(22) Filed: Oct. 30, 2017

(65) Prior Publication Data
US 2018/0124076 A1    May 3, 2018

(30) Foreign Application Priority Data
Oct. 31, 2016 (DE) .......................... 10 2016 221 378

(51) Int. Cl.
*H04L 29/06* (2006.01)

(52) U.S. Cl.
CPC .......... *H04L 63/1416* (2013.01); *H04L 63/02* (2013.01); *H04L 63/0227* (2013.01); *H04L 63/08* (2013.01); *H04L 63/1491* (2013.01); *H04L 63/0823* (2013.01); *H04L 63/0861* (2013.01)

(58) Field of Classification Search
CPC . H04L 63/1416; H04L 63/02; H04L 63/0227; H04L 63/08; H04L 63/1491; H04L 63/0823; H04L 63/0861
USPC .......................................................... 726/24
See application file for complete search history.

(56) References Cited

U.S. PATENT DOCUMENTS

| | | | | |
|---|---|---|---|---|
| 9,871,810 B1* | 1/2018 | Miskovic | ............ | H04L 63/1416 |
| 10,250,689 B2* | 4/2019 | Kaster | ................. | H04L 63/1433 |
| 2007/0050777 A1* | 3/2007 | Hutchinson | ......... | G06F 11/0709 |
| | | | | 718/104 |
| 2013/0298242 A1* | 11/2013 | Kumar | .................... | G06F 21/52 |
| | | | | 726/25 |
| 2017/0063996 A1* | 3/2017 | Kaster | ................. | H04L 63/1433 |

FOREIGN PATENT DOCUMENTS

DE            19810512 A1    9/1999

* cited by examiner

*Primary Examiner* — Andrew J Steinle
*Assistant Examiner* — Sakinah White Taylor
(74) *Attorney, Agent, or Firm* — Norton Rose Fulbright US LLP; Gerard Messina

(57) ABSTRACT

A method for protecting a device from information attacks, in which received from the at least one device are checked by a security device, included in the at least one device, for an information attack, and for the case that the received data are associated with an information attack, characteristic data concerning the information attack are stored in the at least one device and transmitted via a communication interface to a unit in communicative connection with a plurality of devices, and the unit evaluates the characteristic data transmitted from the at least one device and outputs a warning message to at least a portion of the devices in communicative connection with the unit as a function of at least one predefined criterion.

22 Claims, 3 Drawing Sheets

METHOD FOR TRANSMITTING DATA

CROSS REFERENCE

The present application claims the benefit under 35 U.S.C. § 119 of German Patent Application No. DE 102016221378.4 filed on Oct. 31, 2016, which is expressly incorporated herein by reference in its entirety.

FIELD

The present invention relates to a method for transmitting data, and a system with an interface that is configured for carrying out the provided method. Moreover, the present invention relates to a security system that is configured for carrying out the provided method.

BACKGROUND INFORMATION

Control units in motor vehicles generally contain a nonvolatile memory, typically an EEPROM, which stores errors which may be retrieved at a later time by a device that is connected to an interface of the vehicle, for example using a so-called "Unified Diagnostic Services Standard." In addition, errors having high priority are likewise indicated to the user with the aid of warning lights in a vehicle. A serious error may result in the vehicle being switched into a secure mode or shut down.

The continual increase in the number and miniaturization of digital computer devices has resulted in small computers that are present in everyday objects. This development is generally referred to as the "Internet of Things." As with most computer devices, in particular computer devices in networks, such computers that are installed in everyday objects are often connected to the Internet, and may be the object of information attacks. To protect such everyday objects, and thus also their users, from information attacks, security devices, for example firewalls, are generally used. The security devices typically store lists of detected activities or information attacks for retrieval by auditors or IT experts on a routine basis or in cases of recently discovered information attacks. These lists may provide the auditors or IT experts with information about the frequency and complexity of the information attacks.

German Patent Application No. DE 198 10 512 A1 describes a method for generating an error signal in a motor vehicle, in which a display means is controlled as a function of a state of the motor vehicle.

SUMMARY

In accordance with the present invention, a method, a security system, and a system with an interface, are provided. Specific embodiments of the present invention are described herein.

A security system is thus described which includes security mechanisms and a unit for processing information concerning information attacks. Moreover, a method is described with which the security of the security system with respect to information attacks may be increased.

The provided method is usable in systems that protect at least one device, i.e., an everyday object that includes a processing unit, such as a vehicle, an object in the household, a tool, or any other object for everyday use that is equipped with a processing unit. It is provided that the at least one device includes at least one security device which protects information stored in the device concerning user behavior, for example. In addition, it is necessary for the at least one device to exchange via a communication interface, such as a wireless interface with at least one unit, for example a server, information concerning an activity of the security device which is included in the at least one device, and which is at least configured for detecting and recording information attacks.

By use of a security system described above, the presented method provides that characteristic data, i.e., in particular information concerning information attacks, recorded by the security device of the at least one device are transmitted via the communication interface to the unit, which may be, for example, a server of a manufacturer of the device.

The characteristic data are compiled by the security device, in particular in the case of an information attack on the device, and stored on a nonvolatile memory, for example, such as an EEPROM, and transmitted directly or with a time delay to the unit.

The unit processes the characteristic data transmitted from the device, in that the unit carries out a data evaluation in which particularly critical attacks are recognized and recorded by the unit. For this purpose, the unit may use, for example, so-called "data mining" techniques which, based on predefined criteria, for example with the aid of monitored machine learners or based on unmonitored machine learners, such as a K-means method or an expectation maximization method, evaluate characteristic data received from the unit and assign information attacks in question to various classes. It is provided in particular that pieces of information from a plurality of devices are integrated and examined with the aid of a joint data analysis. With the aid of the data evaluation, the unit identifies particularly critical information attacks, i.e., information attacks that have caused particularly severe damage or that have attacked the in particular large number of devices. Any technically meaningful criterion, for example in the form of user specifications, for selecting and classifying the characteristic data that are transmitted from the at least one device may be used.

It is possible for a user to establish a criteria catalog that contains rules concerning how particular information transmitted from a device is to be selected and classified. By use of such a criteria catalog, it may be provided, for example, that if an information attack is carried out with at least one predefined frequency and/or for at least one predefined portion of devices that are connected to the unit, the information attack is identified, recorded, and reported to at least a portion of devices that are in communicative connection with the server. The report concerning the information attack may also include, for example, information concerning how particular devices may be protected from the information attack. For this purpose, for example control commands or protection methods may be transmitted to the devices connected to the unit.

It is possible that a user of a device connected to the unit may specify a criterion that outputs a warning message only when a predefined number of information attacks have been assigned to a "dangerous" class, or a number of information attacks is exceeded in a predefined time period.

Of course, a report concerning a recognized information attack may also be transmitted to a device which itself has transmitted the characteristic data concerning the attack to the unit. The report may contain the following information, for example: "Device is under attack."

In addition, based on particular information or characteristic data transmitted from a device, such as a vehicle, to the unit, conclusions may be drawn concerning a state of the device itself which is transmitting the information. For this purpose, the characteristic data may be analyzed by the unit and, for example, compared to information concerning information attacks that is present on the unit, which the unit, for example, retrieves from a database or itself ascertains by evaluating information from further devices. Based on such a comparison, for example a likelihood of the device being attacked, i.e., hacked, at that moment via an information attack may be computed. For example, the unit, based on a number of attempted attacks on a communication interface of a particular device, may determine whether an information attack is taking place, or a user is merely having operating problems.

In particular, a chain made up of a sensor, a processing element, and an actuator is necessary for carrying out the provided method. This means that a security device, included in a device as a sensor, collects characteristic data concerning a particular information attack and transmits same to a unit, such as a server or a network, as a processing element. The unit processes the characteristic data and, based on the processing, transmits at least one piece of information and/or at least one control command to at least a portion of a plurality of devices connected to the unit.

Any device or software that is technically suitable for recognizing information attacks is appropriate as a security device for recognizing an information attack. In particular, a security device may be a mechanism for filtering data transmitted via a network, such as a gateway or a firewall, which is configured, for example, for checking data traffic between various control units of one or multiple devices based on markers in the data, and outputting a warning message when an information flow does not proceed according to a predefined pattern.

Further security devices may be, for example, software modules which check for manipulations with the aid of a so-called hardware security module, for example "secure boot"-installed software or firmware. Also suitable as a security device is software that prevents software or firmware from being modified without authentication. So-called trusted platform modules and systems for recognizing abnormal behavior, such as intrusion attempts, may be recognized by virus scanners, intrusion detection systems, or so-called "honeypots," so that these types of systems are also suitable as a security device for recognizing information attacks. In addition, so-called "shadow stacks" that detect a change in the execution sequence or a logic of the software or firmware may also be used as a security device.

In order to transmit particular characteristic data of an information attack from a security device of a device to the unit, the device itself may include an interface or may be connected to an external interface, for example a mobile processing unit or a security query device provided by a manufacturer of the device, which ultimately transmits characteristic data ascertained by the security device to the unit. To preclude manipulation of the unit, it may be provided that the device and/or the interface used for transmitting the characteristic data and/or a network used for transmitting the characteristic data authenticate(s) themselves/itself to the unit. For the case that an external interface is used, it is also conceivable for a particular device and/or a user of the device to have to authenticate themselves/itself to the external interface prior to a transmission of characteristic data to the external interface.

For authentication to the unit or an external interface, it may be provided, for example, that an authentication feature such as a password has to be input by a user of a particular device or by a person using the device at the time of a particular information attack. The authentication feature may include, for example, a character sequence, a biometric feature, a cryptographic key, or a value derived from a cryptographic key.

For the unit to supply devices with information concerning information attacks, it may be provided that the unit automatically transmits ascertained information concerning information attacks, immediately or at regular time intervals, to particular devices that are in communicative connection with the unit, or that the devices request from the unit the information concerning the information attacks, for example with the aid of a so-called poll method. Such a poll method may take place automatically, for example as a function of a state of a particular device, for example during a start operation. It may be provided that for carrying out the poll method, the device and the unit exchange a security certificate.

As soon as the device receives information concerning information attacks from the unit, the device may process the information and, for example, represent it to a user or transmit the information, for example via a Car-2-X interface, to other devices that are connected to the device. It is conceivable for the device to switch into a safety mode, as a function of the information transmitted by the unit concerning the information attack itself, in which, for example, communication units of the device are deactivated, or safety-relevant functions, such as functions for controlling an engine or steering of a vehicle, are deactivated.

Furthermore, it is possible for a user of a device to log in on the unit via a communication unit, for example a smart phone, and for the unit to transmit information concerning the device to the communication unit, or for the user to query information from the unit with the aid of the communication unit. It may be provided that the user has to authenticate him/herself to the unit, for example to query information concerning information attacks carried out on the user's device or similar devices.

The unit may provide to a user logged in on the unit, for example, information concerning log-in operations on a device of the user, so that the user may recognize which person has attempted to log onto the user's device, and when. For example, an authentication may be provided, with the aid of which the user provides proof that the user is authorized to view information concerning log-in operations on the device or to view information attacks carried out on the device. Based on a list of information concerning log-in operations on the device or information attacks on the device, the user may, for example, select certain log-in operations or certain persons logging in, and indicate them as a security concern so that in the future, a log-in operation by these selected persons logging in is automatically blocked on the user's device, or optionally, on the devices that are connected to the unit, via an appropriate communication to all devices connected to the unit.

Further advantages and embodiments of the present invention are described herein and are shown in the figures.

It is understood that the features stated above and explained below may be used not only in the particular stated combination, but also in other combinations or alone without departing from the scope of the present invention.

DETAILED DESCRIPTION OF EXAMPLE EMBODIMENTS

Figure 1:
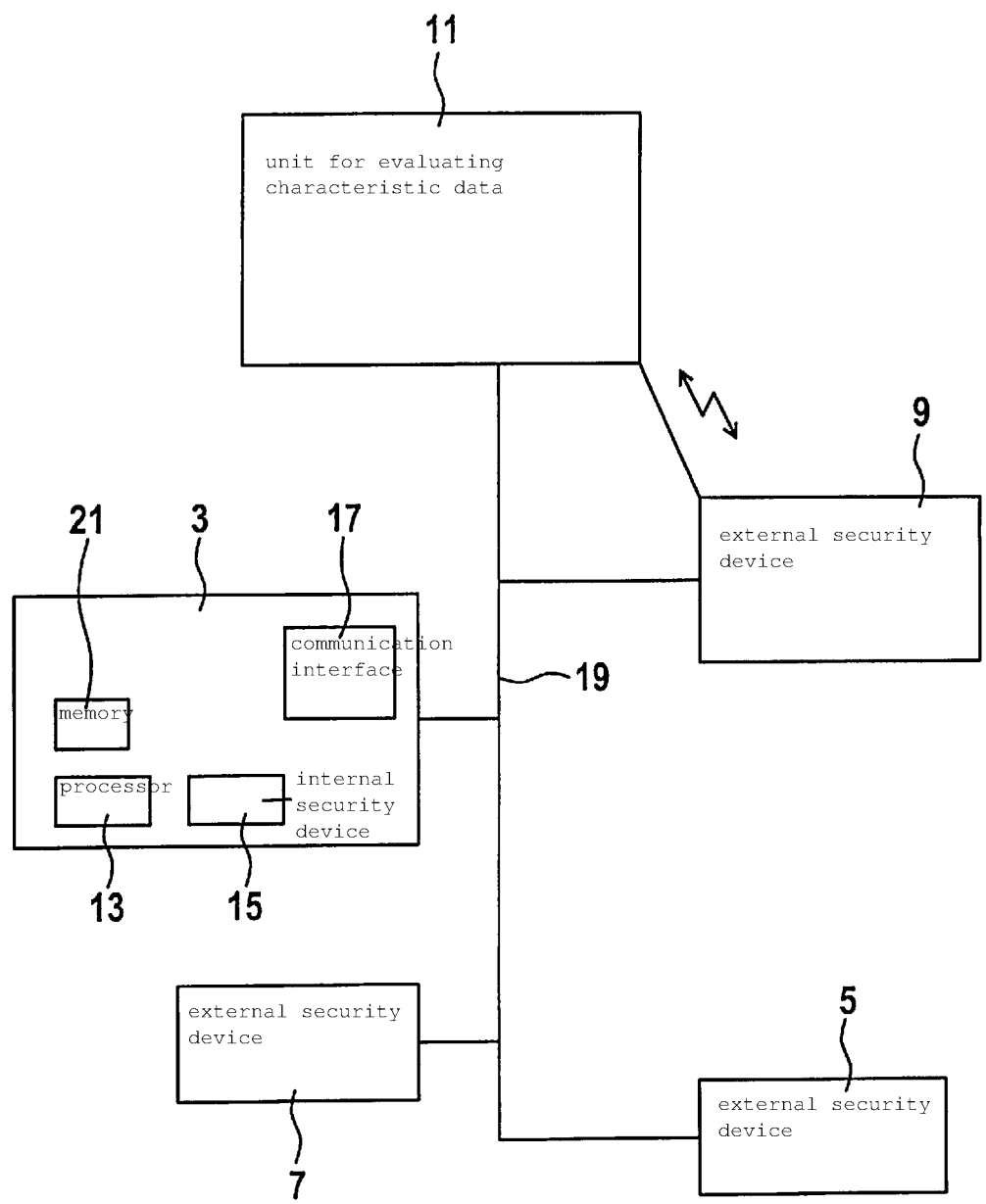
FIG. 1 shows one specific embodiment of the provided security system.

The present invention is schematically illustrated in the figures, based on specific embodiments, and is described in greater detail below with reference to the figures.

The figures are described in an interrelated and all-encompassing manner, with identical components being provided with the same reference numerals.

FIG. 1 illustrates a security system 1 that includes a device 3, for example in the form of a vehicle, external security devices 5, 7, and 9, and a unit 11 for evaluating characteristic data.

Device 3 includes a processor 13, an internal security device 15 in the form of a so-called shadow stack, and a communication interface 17 for communication with a network 19, such as a mobile communications network. Device 3 is secured with respect to a communication with network 19 via a security device 5 in the form of a so-called honeypot, and a security device 7 in the form of a so-called intrusion detection system.

Network 19 includes a security device 9 that is designed as a so-called gateway-based firewall, with the aid of which data to be transmitted to unit 11 via network 19 may be filtered. For this purpose, the security device may communicate with unit 11 in a wired or a wireless manner.

In the event of an information attack on device 3, the information attack is recognized by internal security device 15, for example, and reported to processor 13. Based on the report of security device 15, characteristic data of the information attack, such as the date, time, type and frequency of the information attack, which security device has detected the attack, whether the attack was detected or prevented, which portion of device 3 was the target of the information attack, the source of the information attack, or any other technically relevant pieces of information are stored in a memory 21 of device 3 and transmitted to unit 11.

The transmission of the characteristic data may take place directly, after the information attack has been recognized, or at regular time intervals. For transmission of the characteristic data, device 3 authenticates itself to unit 11, for example by exchanging a security certificate.

Based on the characteristic data transmitted from device 3 and optionally other devices, unit 11, which may be, for example, a server or a system of interconnected servers, such as a network in a processing center or a database server with a web server, or a proxy server, carries out an evaluation of the characteristic data, i.e., optionally all characteristic data transmitted from a plurality of devices, and classifies the information attack or corresponding attacks corresponding to the characteristic data. Unit 11 assigns the information attack or attacks to a "dangerous" category, for example. For this purpose, unit 11 may make an association of the information attack or attacks with a predefined class, for example via an unattended or an attended automatic learner such as an artificial neuronal network, a so-called K-means algorithm, or a so-called expectation maximization algorithm. It is provided in particular that the unit jointly evaluates characteristic data that have been transmitted from various devices 3, and correspondingly generates an overview of a security situation, for example in a geographical area or for a certain manufacturer or a certain product line.

Unit 11 creates a warning message as a function of a result of the evaluation of particular characteristic data by unit 11.

In addition, unit 11 also optionally creates a security plan which, for example, provides for a deactivation of communication devices of particular devices. The unit transmits the warning message and/or control commands corresponding to the security plan to at least a portion of the devices connected to unit 11.

Figure 2:
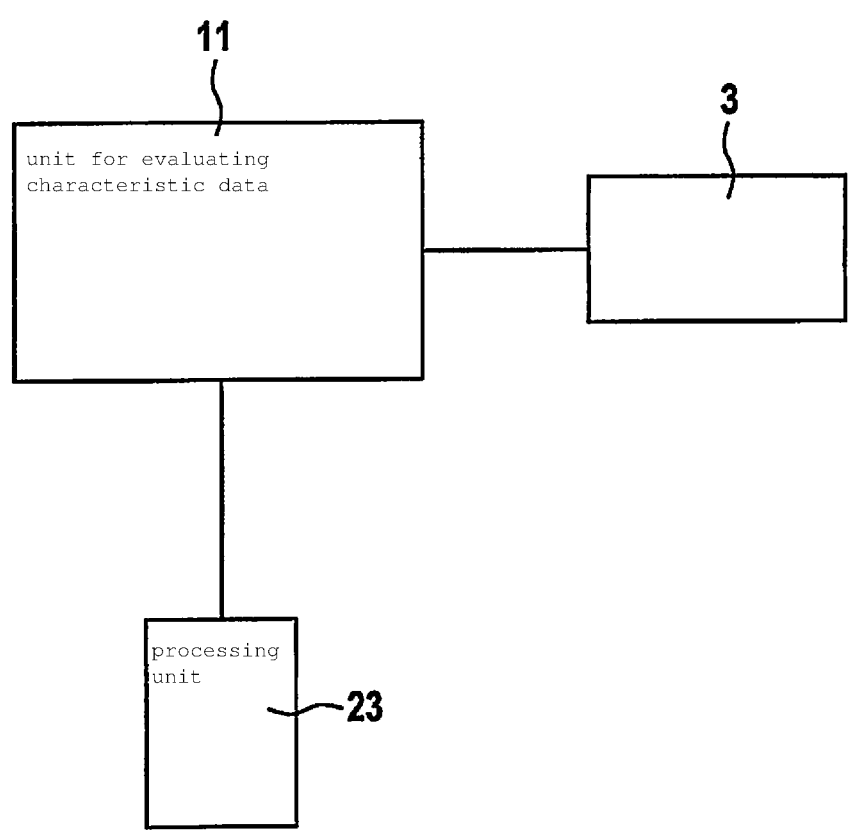
FIG. 2 shows one specific embodiment of the provided method.

FIG. 2 illustrates a direct transmission path of characteristic data to unit 11. This means that unit 11 receives characteristic data from device 3 via the communication interface encompassed by device 3, and from a user via a mobile processing unit 23. Unit 11 integrates the characteristic data from device 3 and the characteristic data from mobile processing unit 23 and evaluates same. If an information attack carried out on device 3 and/or mobile processing unit 23 is classified as dangerous, unit 11 transmits a warning message to device 3 and/or mobile processing unit 23.

Figure 3:
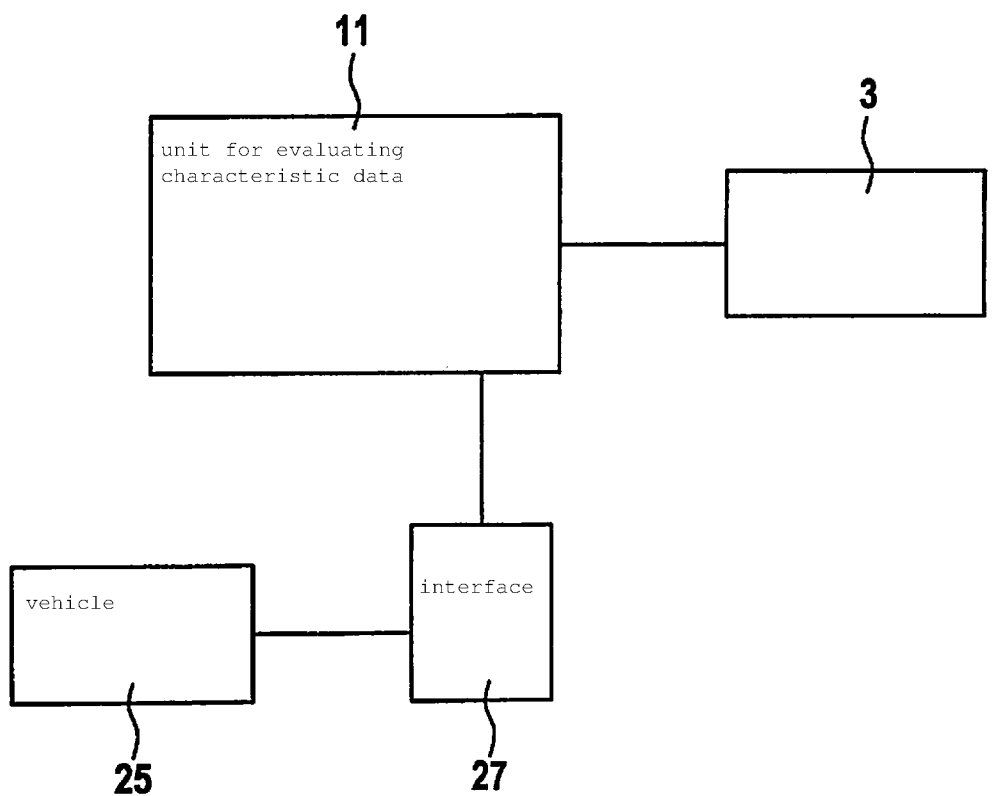
FIG. 3 shows another specific embodiment of the provided method.

FIG. 3 illustrates an indirect transmission path of characteristic data to unit 11. This means that characteristic data from a vehicle 25 are initially transmitted to an interface 27, and from there to unit 11. Device 3 remains in direct communicative connection with unit 11 via communication interface 17.

Interface 27 is directly connected to vehicle 25, and may be, for example, a server of an authorized repair shop. It may be provided that under certain circumstances, for example when longer than a specified time period has elapsed since an information attack, interface 25 immediately transmits a warning message which includes, for example, the wording "vehicle is being hacked" to a communication device of a user of vehicle 25, for example.

Unit 11 may request an authentication from device 3 in order to transmit the characteristic data to the unit. For authentication of device 3, for example an authentication of a user of device 3 or an authentication of a user who is presently logged in on device 3 or who was logged in at the time of a particular information attack may be requested. An authentication could use a user password, for example, that is entered in device 3 or a processing unit connected to device 3. A biometric identification of the user of device 3, a key that is stored in a reliable element in the device, for example, or any other technically suitable information for authentication to unit 11 may also be used as a password.

What is claimed is:

1. A method for protecting a plurality of devices from information attacks, the plurality of devices each including a respective processor and a respective memory, the method comprising:

directly or indirectly from each of at least a subset of the plurality of devices, obtaining by a central device that includes a central processor and that is communicatively coupled to the plurality of devices via at least one communication interface, respective characteristic data (a) that is regarding an information attack on the respective device and (b) that the processor of the respective device stores in the memory of the respective device;

evaluating, by the central device, the characteristic data obtained from the at least the subset of the plurality of devices; and outputting, by the central device, a warning message to one or more of the plurality of devices based on a result of the evaluation;

wherein the evaluation includes:

determining that the information attack occurred at least a predefined frequency within all of the plurality of devices in combination;

determining that the information attack occurred in at least a predefined portion of the plurality of devices;

determining a geographic area in which are located all of the at least the subset of the plurality devices from which the characteristic data regarding the information attack was obtained;

determining a product line commonality of the at least the subset of the plurality devices from which the characteristic data regarding the information attack was obtained; and/or determining a manufacturer commonality of the at least the subset of the plurality devices from which the characteristic data regarding the information attack was obtained.

2. The method as recited in claim 1, wherein the warning message includes at least one of: (i) information concerning the information attack and (ii) control commands for averting the information attack.

3. The method as recited in claim 1, wherein the warning message includes control commands that provide instructions for deactivating the one or more devices.

4. The method as recited in claim 1, wherein the at least one communication interface is external to and connectable to the plurality of devices.

5. The method as recited in claim 4, wherein the at least one external communication interface is part of one or more security query devices of at least one manufacturer of the plurality of devices.

6. The method as recited in claim 1, wherein the plurality of devices each includes a security device configured to provide output to the respective processor of the respective device, based on which output the respective processor is configured to store the characteristic data in the respective memory of the respective device, and the security device is selected from the following list of security devices: (i) a gateway, (ii) a firewall, (iii) a hardware security module, (iv) a trusted platform module, (v) a system for recognizing intrusion attempts, (vi) an intrusion detection system, (vii) an intrusion prevention system, (viii) a virus scanner, or (ix) a honeypot.

7. The method as recited in claim 1, further comprising the central device authenticating the plurality of devices prior to the evaluation of characteristic data obtained from the plurality of devices.

8. The method as recited in claim 1, wherein log-in information of users who have carried out a log-in attempt on the plurality of devices within a predefined time period is provided to a user who is logged in at that moment on the central device in communicative connection with the plurality of devices.

9. The method as recited in claim 8, wherein log-in attempts on the plurality of devices by persons logging in who are selected by the user based on the provided log-in information are automatically prevented.

10. The method as recited in claim 1, wherein the evaluation includes the determining that the information attack occurred at least the predefined frequency within all of the plurality of devices in combination.

11. The method as recited in claim 1, wherein the evaluation includes the determining that the information attack occurred in the at least the predefined portion of the plurality of devices.

12. The method as recited in claim 1, wherein the evaluation includes the determining the geographic area in which are located all of the at least the subset of the plurality devices from which the characteristic data regarding the information attack was obtained.

13. The method as recited in claim 1, wherein the evaluation includes the determining the product line commonality of the at least the subset of the plurality devices from which the characteristic data regarding the information attack was obtained.

14. The method as recited in claim 1, wherein the evaluation includes the determining the manufacturer commonality of the at least the subset of the plurality devices from which the characteristic data regarding the information attack was obtained.

15. The method as recited in claim 1, wherein the plurality of devices are respective vehicles.

16. The method as recited in claim 15, wherein the vehicles receiving the warning message are configured to disable an automatic drive control of the respective vehicles in response to the warning message.

17. The method as recited in claim 16, wherein the automatic drive control is a steering control.

18. A central device for protecting a plurality of devices from information attacks, the plurality of devices each including a respective processor and a respective memory, the central device comprising:

a processor; and an interface;

wherein the processor is configured to:

via the interface, receive directly or indirectly from each of at least a subset of the plurality of devices, respective characteristic data (a) that is regarding an information attack on the respective device and (b) that the processor of the respective device stores in the memory of the respective device;

evaluate the characteristic data obtained from the at least the subset of the plurality of devices; and output a warning message to one or more of the plurality of devices based on a result of the evaluation;

wherein the evaluation includes:

determining that the information attack occurred at least a predefined frequency within all of the plurality of devices in combination;

determining that the information attack occurred in at least a predefined portion of the plurality of devices;

determining a geographic area in which are located all of the at least the subset of the plurality devices from which the characteristic data regarding the information attack was obtained;

determining a product line commonality of the at least the subset of the plurality devices from which the characteristic data regarding the information attack was obtained; and/or determining a manufacturer commonality of the at least the subset of the plurality devices from which the characteristic data regarding the information attack was obtained.

19. A security system comprising:

a plurality of devices that each includes a respective processor and a respective memory; and a central device that includes a processor and an interface, wherein the processor is configured to:

via the interface, receive directly or indirectly from each of at least a subset of the plurality of devices, respective characteristic data (a) that is regarding an information attack on the respective device and (b) that the processor of the respective device stores in the memory of the respective device;

evaluate the characteristic data obtained from the at least the subset of the plurality of devices; and output a warning message to one or more of the plurality of devices based on a result of the evaluation;

wherein the evaluation includes:
- determining that the information attack occurred at least a predefined frequency within all of the plurality of devices in combination;
- determining that the information attack occurred in at least a predefined portion of the plurality of devices;
- determining a geographic area in which are located all of the at least the subset of the plurality devices from which the characteristic data regarding the information attack was obtained;
- determining a product line commonality of the at least the subset of the plurality devices from which the characteristic data regarding the information attack was obtained; and/or
- determining a manufacturer commonality of the at least the subset of the plurality devices from which the characteristic data regarding the information attack was obtained.

20. The security system of claim 19, further comprising:
an interface, wherein the interface is configured to establish a communicative connection with the plurality of devices, includes a processor configured to ascertain, the characteristic data based on input received from the plurality devices via the communicative connection, and is configured to transmit the ascertained characteristic data to the central device for performance of the evaluation.

21. The security system as recited in claim 20, wherein the interface carries out a data exchange with the plurality of devices as a function of an authentication of the at least one device at least one of: (i) the interface, and (ii) the central device.

22. A central processing device comprising a processor configured to perform a method for protecting from information attacks a plurality of external devices communicatively coupled to the central processing device via at least one communication interface, the plurality of devices each including a respective processor and a respective memory, the method comprising:
- directly or indirectly from each of at least a subset of the plurality of devices, obtaining respective characteristic data (a) that is regarding an information attack on the respective device and (b) that the processor of the respective device stores in the memory of the respective device;
- evaluating the characteristic data obtained from the at least the subset of the plurality of devices; and
- outputting a warning message to one or more of the plurality of devices based on a result of the evaluation;

wherein the evaluation includes:
- determining that the information attack occurred at least a predefined frequency within all of the plurality of devices in combination;
- determining that the information attack occurred in at least a predefined portion of the plurality of devices;
- determining a geographic area in which are located all of the at least the subset of the plurality devices from which the characteristic data regarding the information attack was obtained;
- determining a product line commonality of the at least the subset of the plurality devices from which the characteristic data regarding the information attack was obtained; and/or
- determining a manufacturer commonality of the at least the subset of the plurality devices from which the characteristic data regarding the information attack was obtained.

* * * * *